US012700703B2

(12) United States Patent
Ikemoto et al.

(10) Patent No.: US 12,700,703 B2
(45) Date of Patent: Aug. 4, 2026

(54) POWER OUTLET WITH A MOVABLE CONTACT AND RELEASABLE HOLDING MECHANISM

(71) Applicant: OMRON Corporation, Kyoto (JP)

(72) Inventors: Kazuhiro Ikemoto, Kyoto (JP); Kyoya Ichiraku, Kyoto (JP); Yuta Motomura, Kyoto (JP); Koichi Furusawa, Kyoto (JP); Yuki Yamamoto, Kyoto (JP); Minoru Kobayashi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 325 days.

(21) Appl. No.: 18/293,779

(22) PCT Filed: Mar. 16, 2022

(86) PCT No.: PCT/JP2022/011813

§ 371 (c)(1),
(2) Date: Jan. 31, 2024

(87) PCT Pub. No.: WO2023/021764

PCT Pub. Date: Feb. 23, 2023

(65) Prior Publication Data

US 2024/0258751 A1 Aug. 1, 2024

(30) Foreign Application Priority Data

Aug. 18, 2021 (JP) ................................ 2021-133381

(51) Int. Cl.
*H01R 13/71* (2006.01)
*H01R 13/631* (2006.01)

(52) U.S. Cl.
CPC .......... *H01R 13/71* (2013.01); *H01R 13/631* (2013.01)

(58) Field of Classification Search
CPC ...... H01R 13/71; H01R 13/631; H01R 24/78; H01R 13/6278; H01R 13/701; H01R 13/639
See application file for complete search history.

(56) References Cited

U.S. PATENT DOCUMENTS 9,225,125 B2 * 12/2015 Iwamoto ................ H01H 13/14
9,653,855 B2 * 5/2017 Kiryu ..................... H01R 24/78
(Continued)

FOREIGN PATENT DOCUMENTS

CN 210779219 U 6/2020
JP S53-84074 U 7/1978
(Continued)

OTHER PUBLICATIONS

The International Search Report of International Application No. PCT/JP2022/011813 issued on May 31, 2022.
(Continued)

*Primary Examiner* — Edwin A. Leon
(74) *Attorney, Agent, or Firm* — SHINJYU GLOBAL IP

(57) ABSTRACT

A power outlet includes a case, a contact device, an operation member, a moving mechanism, a return spring, and a holding mechanism. The contact device includes a fixed contact, a movable contact, and a movable piece. The moving mechanism moves the movable piece in response to operation of the operation member. The moving mechanism includes a movable member and a return spring. The movable member is movable between a closed position in which the movable contact is in contact with the fixed contact and an open position in which the movable contact is separated from the fixed contact. The return spring urges the movable member toward the open position. The holding mechanism is configured to hold the movable member at the closed position, and releases a holding state in which the movable (Continued)

member is held at the closed position in response to operation of the operation member.

9 Claims, 11 Drawing Sheets

(56) References Cited

U.S. PATENT DOCUMENTS

| | | | | |
|---|---|---|---|---|
| 9,787,036 | B2 * | 10/2017 | Kiryu | H01R 13/7036 |
| 9,972,460 | B2 * | 5/2018 | Iwamoto | H01H 13/14 |
| 2012/0094549 | A1 | 4/2012 | Kobayashi | |
| 2013/0199903 | A1 | 8/2013 | Beak et al. | |
| 2013/0231007 | A1 | 9/2013 | Iwamoto et al. | |
| 2016/0071663 | A1 | 3/2016 | Iwamoto et al. | |
| 2019/0006140 | A1 | 1/2019 | Shi et al. | |

FOREIGN PATENT DOCUMENTS

| | | | |
|---|---|---|---|
| JP | H3-274688 | A | 12/1991 |
| JP | H5-21109 | A | 1/1993 |
| JP | 2012-104448 | A | 5/2012 |
| JP | 2014-38776 | A | 2/2014 |
| JP | 5575504 | B2 | 8/2014 |
| WO | 2010/147008 | A1 | 12/2010 |

OTHER PUBLICATIONS

The Written Opinion of the International Searching Authority of International Application No. PCT/JP2022/011813 issued on May 31, 2022.

* cited by examiner

POWER OUTLET WITH A MOVABLE CONTACT AND RELEASABLE HOLDING MECHANISM

CROSS-REFERENCE TO RELATED APPLICATION

This application is the U.S. National Phase of International Application No. PCT/JP2022/011813, filed on Mar. 16, 2022. That application claims priority to Japanese Patent Application No. 2021-133381, filed Aug. 18, 2021. The contents of those two applications are incorporated by reference herein in their entireties.

FIELD

The claimed invention relates to a power outlet.

BACKGROUND

Conventionally, a power outlet to which an electric plug of an electric device is connected has been known. For example, the power outlet disclosed in Japanese Patent No. 5575504 includes a relay and a switch member. The relay includes a fixed contact and a movable contact. The switch member is supported by the power outlet so as to be movable between a connected position and a disconnected position. The fixed contact and the movable contact of the relay are opened and closed in response to the movement of the switch member, which thereby switches connection and disconnection states between a power source and a power supply terminal.

An arc occurs between the fixed contact and the movable contact when the electrical connection between the power source and the power supply terminal is cut off. The arc between the fixed contact and the movable contact adversely affects the lives of the fixed contact and the movable contact and the operating characteristics of the relay. As such, it is preferable to quickly interrupt the arc. In the power outlet disclosed in Japanese Patent No. 5575504, the speed at which the movable contact is separated from the fixed contact depends only on the restoring force of the leaf spring where the movable contact is arranged. Thus, there is a risk that the arc cannot be interrupted quickly.

SUMMARY

The claimed invention pertains to a power outlet that is able to quickly interrupt the arc that is generated between the fixed contact and the movable contact.

A power outlet according to one aspect of the claimed invention includes a case, a contact device, an operation member, a moving mechanism, a return spring, and a holding mechanism. The contact device includes a fixed contact, a movable contact facing the fixed contact, and a movable piece to be connected to the movable contact. The operation member is movable relative to the case. The moving mechanism is configured to move the movable piece in response to operation of the operation member. The moving mechanism includes a movable member and the return spring. The movable member is movable between a closed position where the movable contact is in contact with the fixed contact and an open position where the movable contact is separated from the fixed contact. The return spring is a separate member from the movable piece and urges the movable member toward the open position. The holding mechanism is configured to hold the movable member at the closed position, and releasing the holding state in which the movable member is held at the closed position in response to operation of the operation member. When released from the holding state, the movable member moves from the closed position to the open position by the urging force of the return spring.

In the power outlet, when the state in which the movable member is held at the closed position is released in response to operation of the operation member, the movable member is moved from the closed position to the open position by the urging force of the return spring. Thus, the movable contact is able to be separated from the fixed contact more quickly than the separation speed in a case where the movable contact is separated from the fixed contact only by the restoring force of a leaf spring. That is, the urging force of the return spring enables the movable member to be quickly moved from the closed position to the open position, and thereby an arc generated between the fixed contact and the movable contact can be quickly interrupted. As a result, it is possible to provide a power outlet that is able to quickly interrupt an arc occurring between the fixed contact and the movable contact.

The return spring may be a coil spring. In this case, the strong return force of the coil spring enables the movable member to be quickly moved from the closed position to the open position.

The holding mechanism may include a locking pawl for locking the movable member at the closed position. The operation member may include a first operation section for moving the movable member from the open position to the closed position, and a second operation section for releasing the locked state in which the movable member is locked by the locking pawl at the closed position. In this case, releasing of the locked state of the locking pawl using the second operation section allows the movable member to quickly move from the closed position to the open position.

The holding mechanism may include a ratchet member and a first biasing member.

The ratchet member may include the locking pawl and may be rotatable between a holding posture to hold the movable member at the closed position and a releasing posture to release the holding state of the movable member. The first biasing member may urge the ratchet member in a direction extending from the releasing posture to the holding posture. In this case, the holding mechanism is constituted by a ratchet mechanism, and thereby it is possible to further quickly move the movable member from the closed position to the open position.

The first operation section may include a locking protrusion configured to be engaged with the locking pawl when the movable member is moved to the closed position. The first operation section may be urged by the return spring in a direction extending from the closed position to the open position via the movable member. In this case, the first operation section and the movable member may be configured as separate bodies, which improves ease of assembly.

The locking pawl may have a flat surface perpendicular to the direction extending from the closed position to the open position. In this case, the movable member can be stably held at the closed position.

The first operation section may be configured to move the movable member from the open position to the closed position by being pressed in a direction extending from the open position to the closed position. In this case, the operability of the first operation section is improved.

The movable piece includes a contact support portion for supporting the movable contact, a base portion, and a first fulcrum located between the contact support portion and the base portion, and may be pivotable around the first fulcrum. The movable member may be configured to move the movable contact away from the fixed contact by pressing the base portion, and to move the movable contact toward the fixed contact by pressing the contact support portion.

The power outlet may further include a restriction mechanism. The case may include a recess into which an electric plug is inserted. The restriction mechanism may be configured to, while the electric plug is not inserted into the recess, restrict movement of the movable member from the open position to the closed position, wherein the movement is caused by operation of the operation member. In this case, it is possible to prevent the fixed contact and the movable contact from coming into contact with each other while the electric plug is not inserted into the recess.

A retaining mechanism may further include a retaining mechanism configured to prevent an electric plug from coming out of the case when the movable member is in the closed position. The retaining mechanism may include a retaining member movable toward and away from an engagement hole that is positioned in the electric plug, and a second biasing member for urging the retaining member toward the operation member. The retaining member may include an inclined portion configured to be pressed against the operation member in response to movement of the operation member. In this case, it is possible to prevent the electric plug from separating from the power outlet 1 in the energized state.

DETAILED DESCRIPTION

Figure 1:
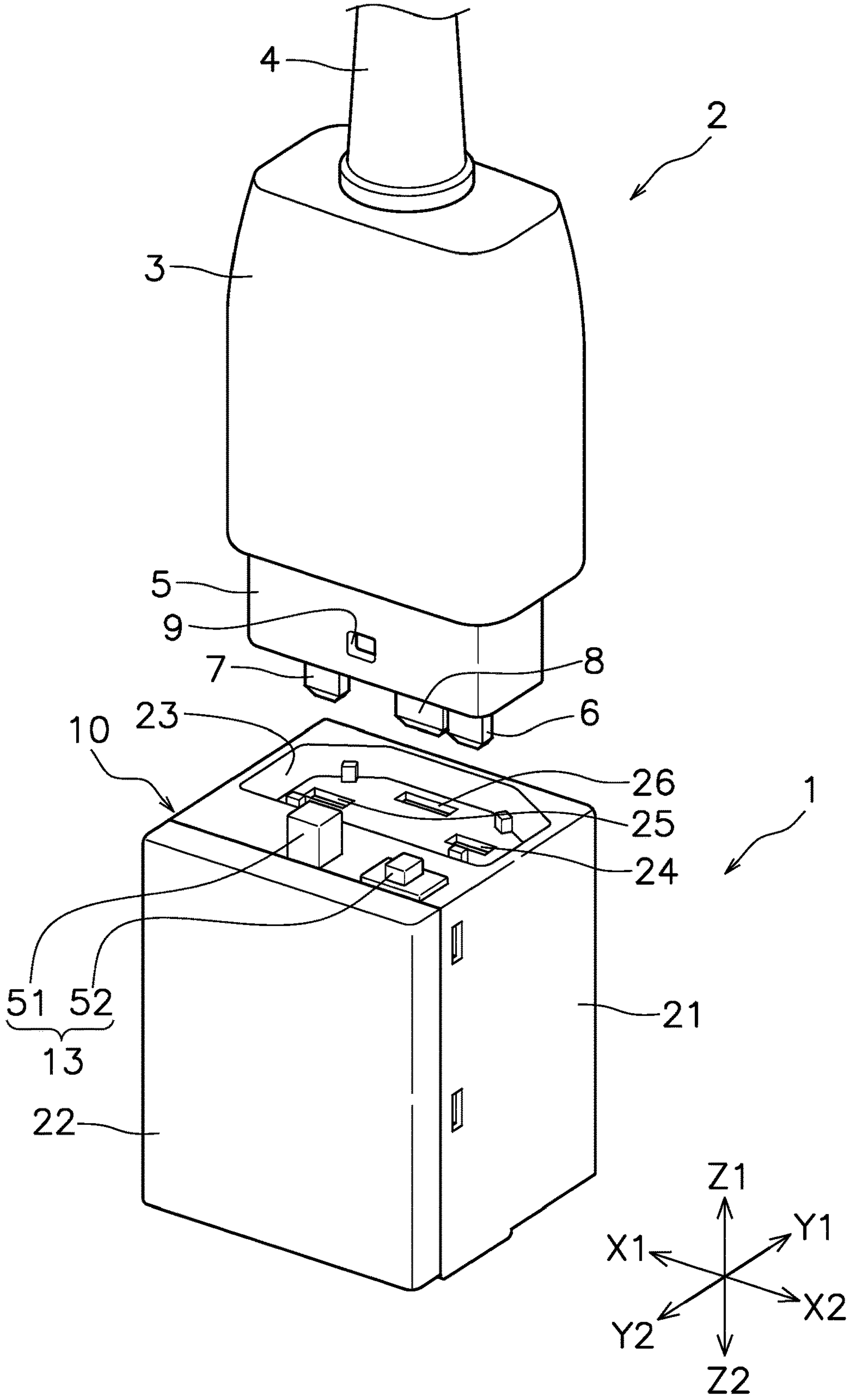
FIG. 1 is a perspective view of a power outlet and an electric plug.

Hereinafter, an embodiment of a power outlet 1 according to one aspect of the claimed invention will be described with reference to the drawings. When referring to the drawings, description will be made assuming that the X1 direction is the leftward direction, the X2 direction is the rightward direction, the Y1 direction is the forward direction, the Y2 direction is the rearward direction, the Z1 direction is the upward direction, and the Z2 direction is the downward direction. These directions are defined for convenience of the description, and do not limit the arrangement directions of the power outlet 1.

The power outlet 1 may be used, for example, in an electrical equipment that requires high-capacity direct current, and is configured to connect or cut off the direct current that flows into the electrical equipment. As shown in FIG. 1, the power outlet 1 receives therein an electric plug 2 that supplies electrical power to an electrical device. The electric plug 2 is, for example, a plug for direct current power supply.

The electric plug 2 includes a plug cover 3, a cable 4, an insertion part 5, a first plug terminal 6, a second plug terminal 7, a plug ground terminal 8, and an engagement hole 9. The cable 4 extends upward from the plug cover 3. The insertion part 5 projects downward from the plug cover 3. The insertion part 5 includes a plug hole 5*a* (see FIG. 10). The plug hole Sa has a concave shape from the bottom to the top.

The first plug terminal 6, the second plug terminal 7, and the plug ground terminal 8 are comprised of conductive material such as copper, and are arranged in the plug hole 5*a*. The first plug terminal 6, the second plug terminal 7, and the plug ground terminal 8 protrude past the insertion part 5. The first plug terminal 6 and the second plug terminal 7 are separated from each other in the left-right direction. The second plug terminal 7 is arranged to the left of the first plug terminal 6.

The plug ground terminal 8 is arranged between the first plug terminal 6 and the second plug terminal 7 in the left-right direction. The plug ground terminal 8 is arranged in front of the first plug terminal 6 and the second plug terminal 7.

The engagement hole 9 is formed in the rear surface of the insertion part 5. The engagement hole 9 passes through the rear surface of the insertion part 5 in the front-back direction.

As shown in FIGS. 1 to 9, the power outlet 1 includes a case 10, a contact device 11, a moving mechanism 12, an operation member 13, and a holding mechanism 14.

The case 10 has a rectangular box shape. The case 10 is comprised of insulating material such as resin, for example. The case 10 includes a case body 21, a cover 22, a recess 23, a first insertion hole 24, a second insertion hole 25, and a third insertion hole 26.

The case body 21 is open rearward. The cover 22 is attached to the rear of the case body 21 so as to close the opening of the case body 21.

The recess 23 is located at the top of the case body 21. The recess 23 has a concave shape downward from the top. The insertion part 5 of the electric plug 2 fits into the recess 23.

The first insertion hole 24, the second insertion hole 25, and the third insertion hole 26 open upward in the recess 23 and extend downward from the recess 23. The first insertion hole 24 is configured to accommodate the first plug terminal 6. The second insertion hole 25 is configured to accommodate the second plug terminal 7. The third insertion hole 26 is configured to accommodate the plug ground terminal 8.

Figure 2:
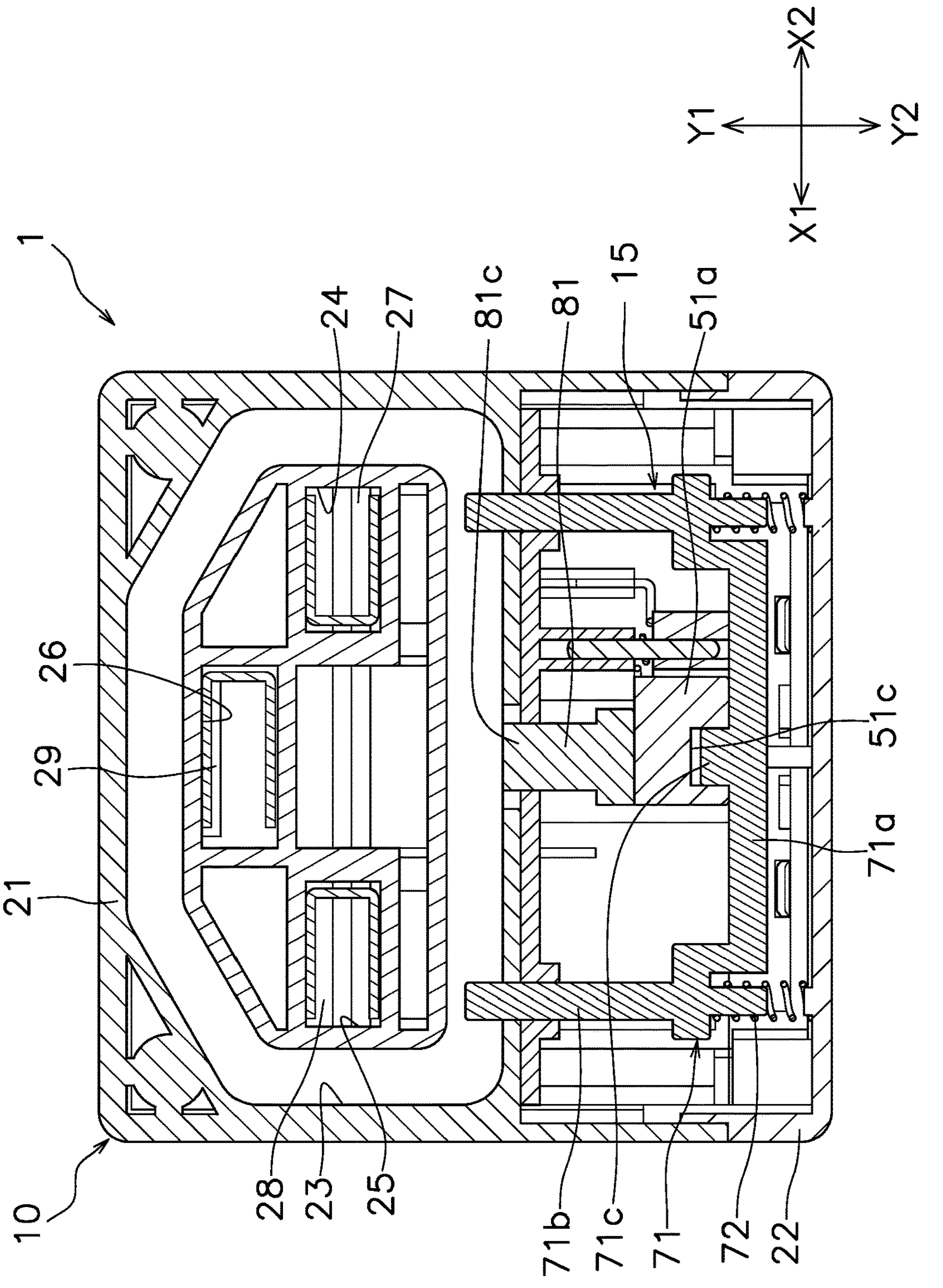
FIG. 2 is a cross-sectional diagram of a power outlet taken along a plane perpendicular to the up-down direction.

As shown in FIG. 2, the power outlet 1 includes a first connection terminal 27, a second connection terminal 28, and a ground terminal 29. The first connection terminal 27 is arranged in the first insertion hole 24 and engages with the first plug terminal 6. The second connection terminal 28 is arranged in the second insertion hole 25 and engages with the second plug terminal 7. The ground terminal 29 is arranged in the third insertion hole 26 and engages with the plug ground terminal 8.

Figure 5:
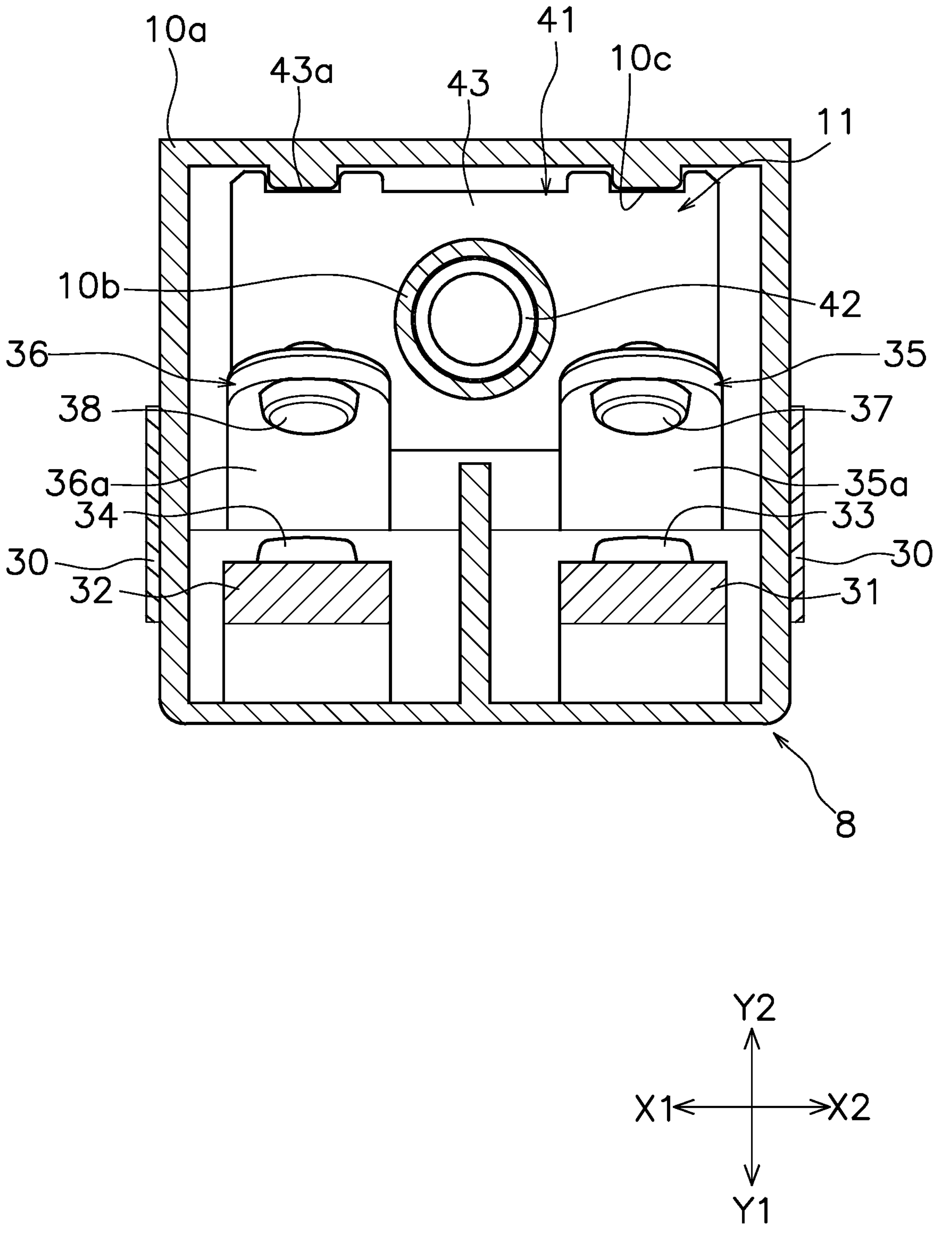
FIG. 5 is a cross-sectional diagram of a contact device taken along a plane perpendicular to the up-down direction.

As shown in FIG. 5, the contact device 11 is disposed in the case 10. The contact device 11 is arranged in a box-shaped contact case 10*a* that is disposed inside the case 10. The contact device 11 is comprised of conductive material.

As shown in FIGS. 3 to 6, the contact device 11 includes fixed terminals 31 and 32, fixed contacts 33 and 34, movable pieces 35 and 36, movable contacts 37 and 38, and support terminals 39 and 40. Note that the contact case 10*a* is omitted in FIGS. 3 and 4.

The fixed terminals 31, 32 extend in the up-down direction. The fixed terminals 31, 32 are supported by the case 10. The fixed terminals 31 and 32 each have a lower end protruding downward from the case 10. The fixed terminals 31, 32 are separated from each other in the left-right direction. The fixed terminal 32 is disposed to the left of the fixed terminal 31.

The fixed contact 33 is connected to the fixed terminal 31. The fixed contact 33 is disposed on the rear surface of the fixed terminal 31.

The fixed contact 34 is connected to the fixed terminal 32. The fixed contact 34 is disposed on the rear surface of the fixed terminal 32.

Figure 6:
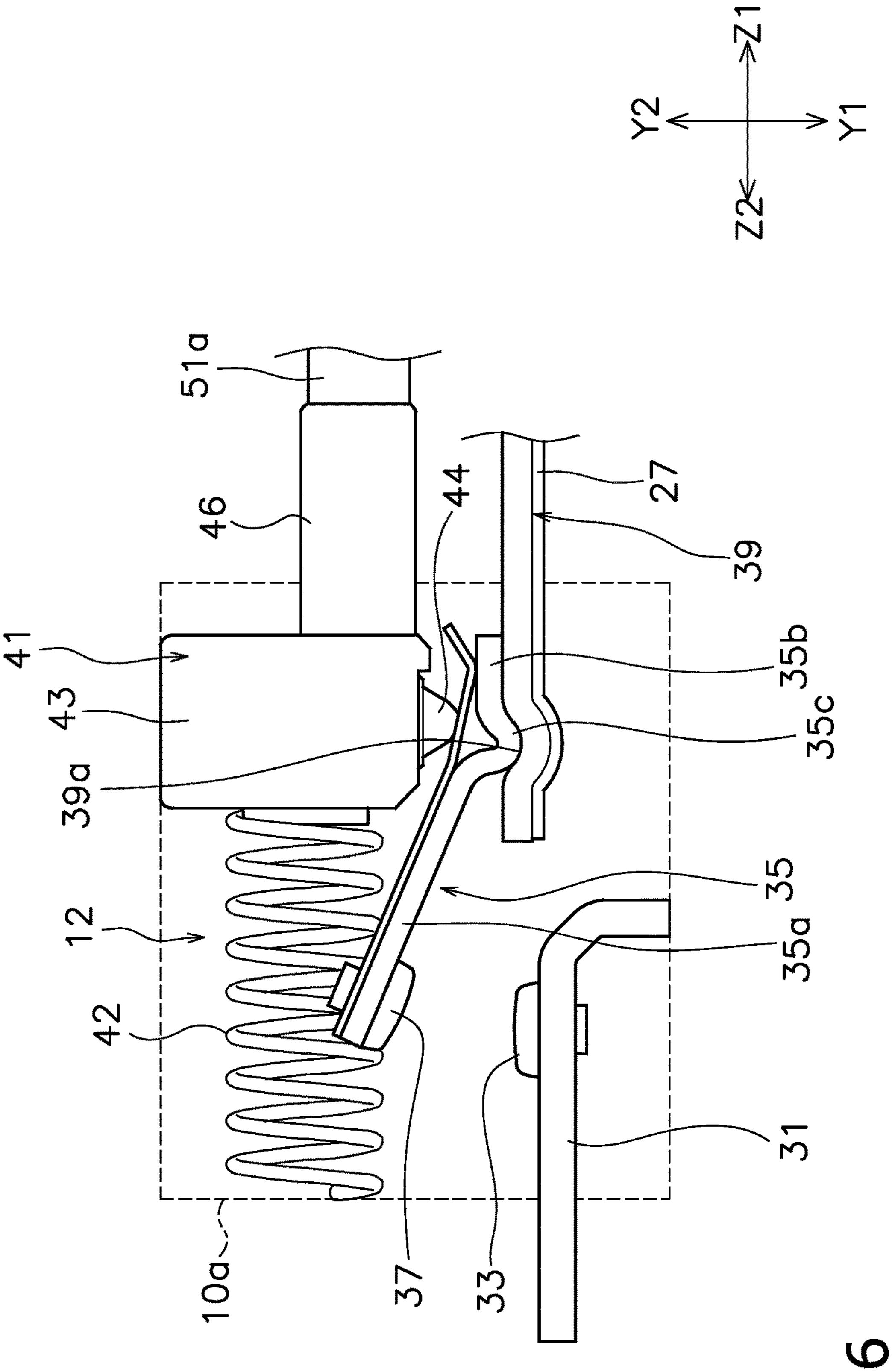
FIG. 6 is a diagram of the inside of a contact device viewed from the right side.
Figure 7:
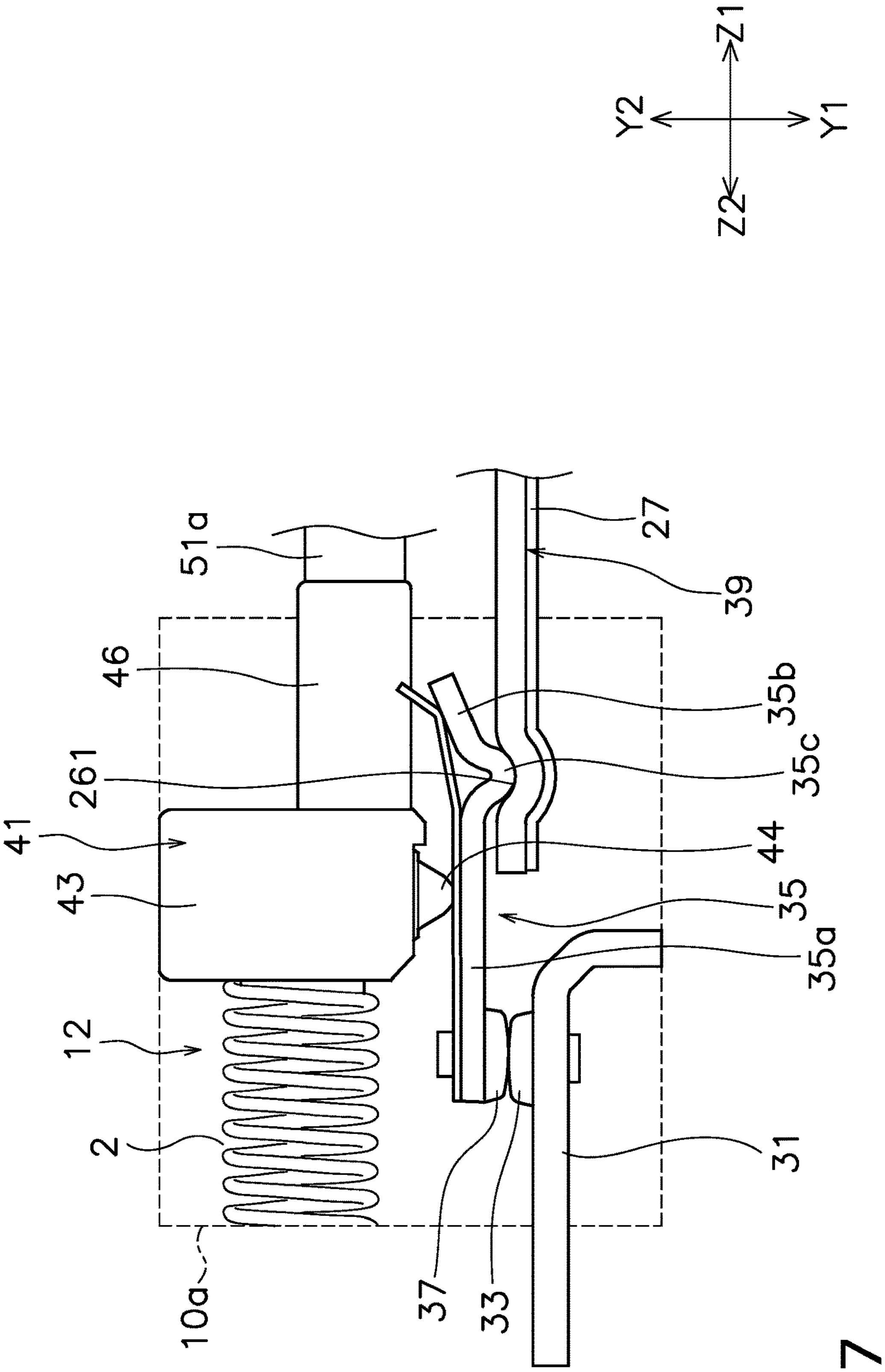
FIG. 7 is a diagram of the inside of a contact device viewed from the right side.

The movable piece 35 extends in the up-down direction. The movable piece 35 is located behind the fixed terminal 31. The movable piece 35 is connected to the first connection terminal 27 via the support terminal 39. As shown in FIG. 6, the movable piece 35 includes a contact support portion 35*a*, a base portion 35*b*, and a first fulcrum 35*c*. The contact support portion 35*a* extends downward from the first fulcrum 35*c*. The contact support portion 35*a* supports the movable contact 37. The base portion 35*b* extends upward from the first fulcrum 35*c*. The first fulcrum 35*c* is convexly curved toward the front.

The movable piece 36 is separated from the movable piece 35 in the left-right direction. The movable piece 36 is disposed to the left of the movable piece 35. The movable piece 36 is located behind the fixed terminal 32. The movable piece 36 is connected to the second connection terminal 28 via the support terminal 40. The movable piece 36 includes a contact support portion 36*a*, a base portion 36*b*, and a second fulcrum (not shown). Since the movable piece 36 is similar to the movable piece 35 in shape, detailed description thereof will be omitted.

The movable contact 37 is connected to the movable piece 35. The movable contact 37 is disposed in the contact support portion 35*a* of the movable piece 35. The movable contact 37 is positioned to face the fixed contact 33 in the front-back direction. The movable contact 37 is configured to contact the fixed contact 33.

The movable contact 38 is connected to the movable piece 36. The movable contact 38 is disposed in the contact support portion 36*a* of the movable piece 36. The movable contact 38 is positioned to face the fixed contact 34 in the front-back direction. The movable contact 38 is configured to contact the fixed contact 34.

The support terminal 39 extends in the up-down direction. The support terminal 39 is supported by the contact case 10*a*. The support terminal 39 is arranged in front of the movable piece 35. The support terminal 39 supports the movable piece 35 so as to be pivotable around the first fulcrum 35*c*. The support terminal 39 includes a receiving portion 39*a* for supporting the first fulcrum 35*c* of the movable piece 35. The receiving portion 39*a* is convexly curved toward the front.

The support terminal 40 is separated from the support terminal 39 in the left-right direction. The support terminal 40 is arranged to the left of support terminal 39. The support terminal 40 is supported by the contact case 10*a*. The support terminal 40 is arranged in front of the movable piece 36. The support terminal 40 supports the movable piece 36 so as to be pivotable around the second fulcrum. The support terminal 40 is similar to the support terminal 39 in shape. The support terminal 40 includes a receiving portion (not shown) for supporting the second fulcrum of the movable piece 36.

The moving mechanism 12 causes the movable pieces 35 and 36 to move in response to an operation of operation member 13. In the present embodiment, in response to operation of the operation member 13, the moving mechanism 12 causes the movable piece 35 to pivot around the first fulcrum 35*c* and causes the movable piece 36 to pivot around the second fulcrum.

The moving mechanism 12 includes a movable member 41 and a return spring 42. The movable member 41 moves between a closed position in which the movable contacts 37, 38 are in contact with the fixed contacts 33, 34 and an open position in which the movable contacts 37, 38 are separated from the fixed contacts 33, 34, in response to operation of the operation member 13. At the open position shown in FIGS. 3 and 6, the movable member 41 causes the movable contact 37 to separate from the fixed contact 33 and causes the movable contact 38 to separate from the fixed contact 34. At the closed position shown in FIGS. 4 and 7, the movable member 41 causes the movable contact 37 to contact the fixed contact 33 and causes the movable contact 38 to contact the fixed contact 34. The movable member 41 in the present embodiment moves in the up-down direction in response to operations of the operation member 13. The movable member 41 is disposed behind the movable pieces 35 and 36.

Figure 8:
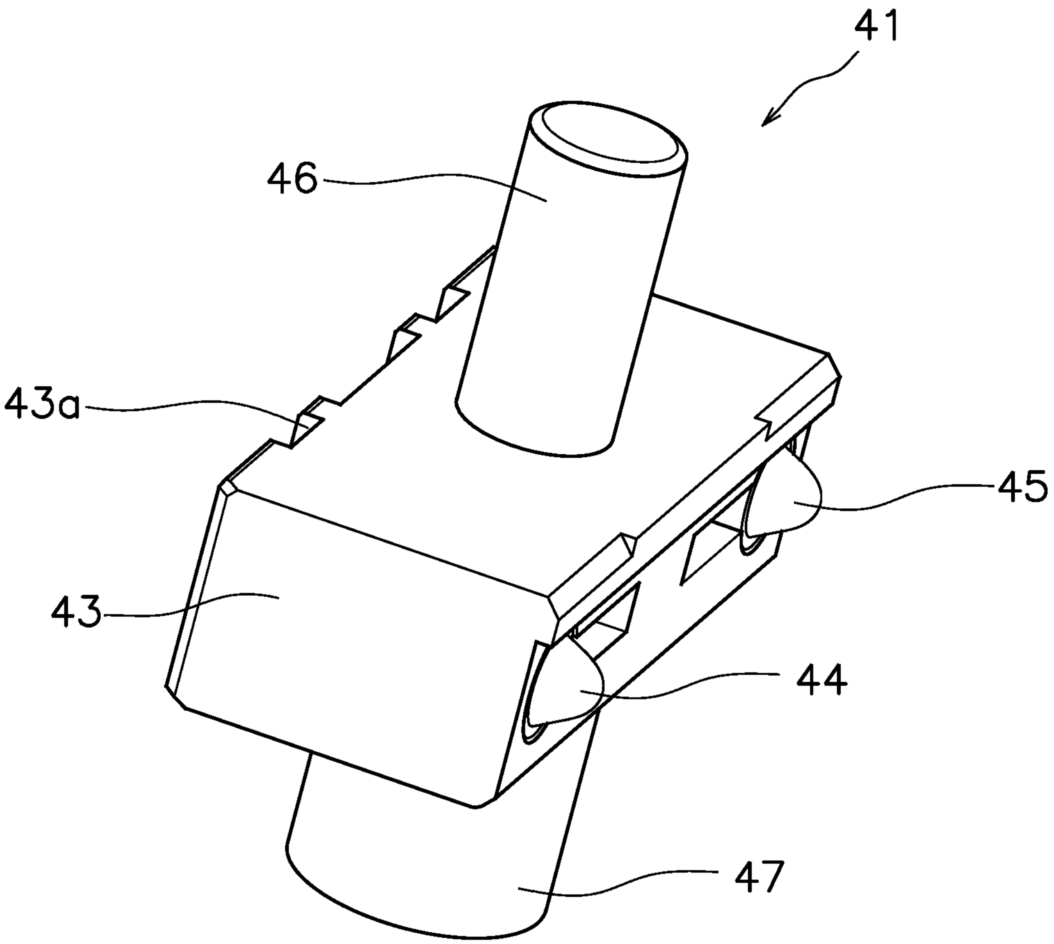
FIG. 8 is a perspective view of a movable member.

As shown in FIG. 8, the movable member 41 includes a main body 43, pushers 44 and 45, a protruding portion 46, and a first cylindrical portion 47. The main body 43 includes a pair of recessed grooves 43*a*. The pair of recessed grooves 43*a* extend in the up-down direction on the rear surface of the main body 43. As shown in FIG. 5, the pair of recessed grooves 43*a* are guided by a rail portion 10*c* that extends in the up-down direction in the contact case 10*a*. As a result, the movable member 41 moves in the up-down direction along the rail portion 10*c*.

The pusher 44 protrudes downward from the main body 43. The pusher 44 is disposed behind the movable piece 35. The pusher 44 protrudes from the main body 43 toward the movable piece 35 for pressing the movable piece 35.

The pusher 45 protrudes downward from the main body 43. The pusher 45 is disposed behind the movable piece 36. The pusher 45 protrudes from the main body 43 toward the movable piece 36 for pressing the movable piece 36.

The protruding portion 46 is arranged between the pusher 44 and the pusher 45 in the left-right direction. The protruding portion 46 protrudes upward from the main body 43.

The first cylindrical portion 47 protrudes downward from the main body 43. The first cylindrical portion 47 accommodates part of the return spring 42.

The return spring 42 is a separate member from the movable pieces 35 and 36 and urges the movable member 41 toward the open position. The return spring 42 in the present embodiment is a coil spring. The return spring 42 is positioned below the main body 43 of the movable member 41. Note that the return spring 42 is arranged inside the first cylindrical portion 47 and a second cylindrical portion 10*b* (see FIG. 5) that is mounted inside the contact case 10*a*. The second cylindrical portion 10*b* is located in the lower portion of the contact case 10*a* and protrudes upward.

The return spring 42 is protected by the first cylindrical portion 47 and the second cylindrical portion 10*b* from an arc that occurs between the fixed contacts 33, 34 and the movable contacts 37, 38. Note that the second cylindrical portion 10*b* may be configured to guide the up-down movement of the first cylindrical portion 47. In FIG. 3, FIG. 4, FIG. 6, and FIG. 7, the first cylindrical portion 47 and the second cylindrical portion 10*b* are omitted. In the present embodiment, as shown in FIG. 5, a permanent magnet 30 is arranged around the contact case 10*a* for extending an arc that occurs between the fixed contacts 33, 34 and the movable contacts 37, 38.

The operation member 13 is supported by the case 10 so as to be movable relative to the case 10. The operation member 13 is disposed behind the recess 23 of the case 10. The operation member 13 protrudes from the top surface of case 10.

The operation member 13 includes a first operation section 51 and a second operation section 52. The first operation section 51 is a press-type operation button and is movable in the up-down direction between a first position shown in FIG. 3 and a second position shown in FIG. 4.

The first operation section 51 extends in the up-down direction. The first operation section 51 is connected to the movable member 41. In the present embodiment, the first operation section 51 is arranged above the protruding portion 46 of the movable member 41 and is in contact with the upper surface of the protruding portion 46. The first operation section 51 is urged toward the first position via the movable member 41 by the return spring 42.

The first operation section 51 moves the movable member 41 from the open position to the closed position. More specifically, when the movable member 41 is in the open position, the first operation section 51 is in the first position. When the movable member 41 is in the closed position, the first operation section 51 is in the second position. When the first operation section 51 is pressed to move from the first position to the second position, the first operation section 51 presses the protruding portion 46 of the movable member 41. The pressing compresses the return spring 42 and moves the movable member 41 from the open position to the closed position.

The first operation section 51 includes a main body 51*a*, a locking protrusion 51*b*, a recess 51*c*, and a pressing protrusion 51*d*. The main body 51*a* extends in the up-down direction. The locking protrusion 51*b* protrudes to the right from the main body 51*a*. The locking protrusion 51*b* has an upper flat surface perpendicular to the up-down direction. The recess 51*c* is located on the rear surface of the main body 51*a*. The recess 51*c* is concaved from the rear toward the front. The pressing protrusion 51*d* protrudes forward from the main body 51*a*.

Figure 3:
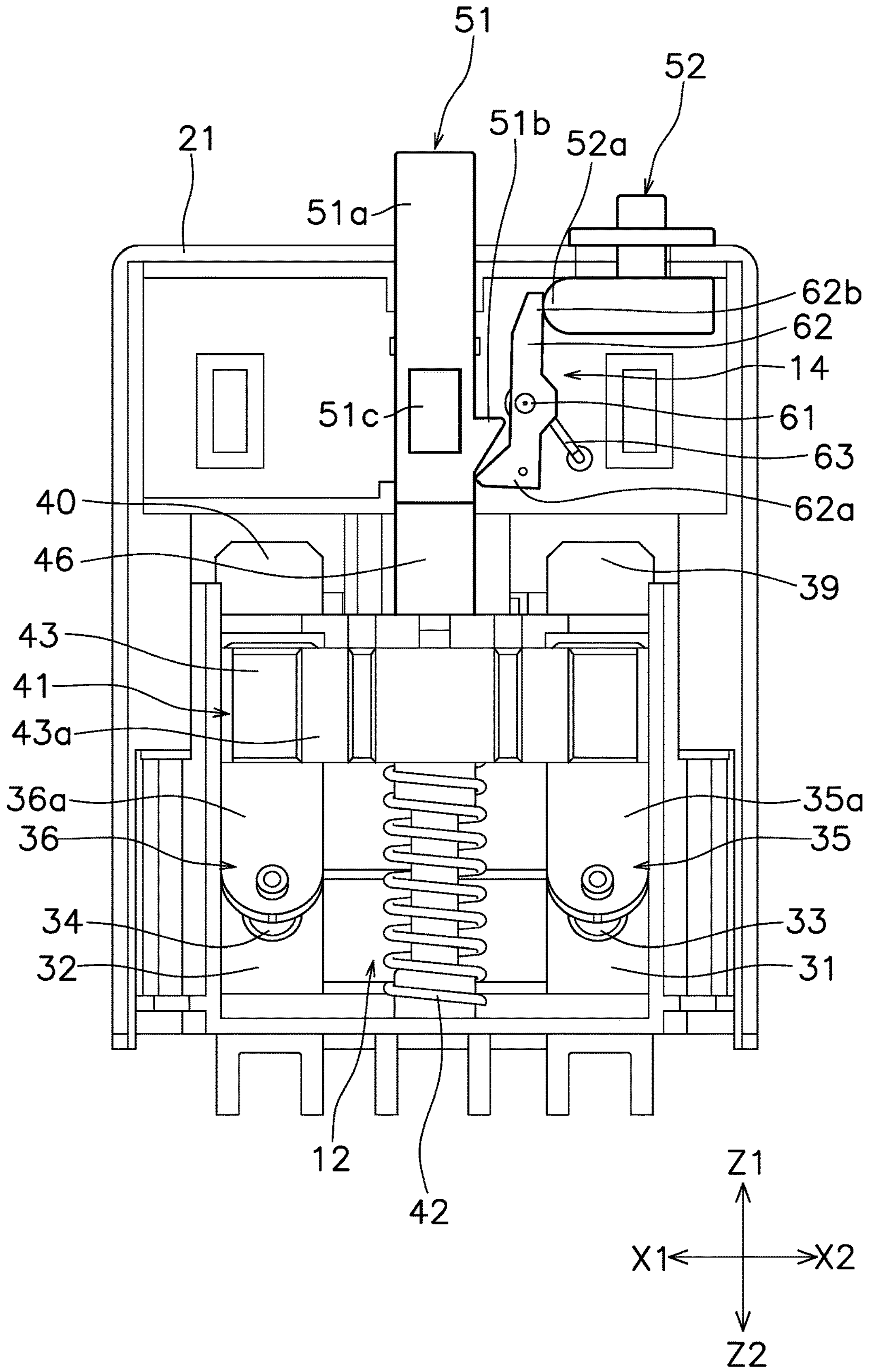
FIG. 3 is a diagram of the inside of a case from the rear.
Figure 4:
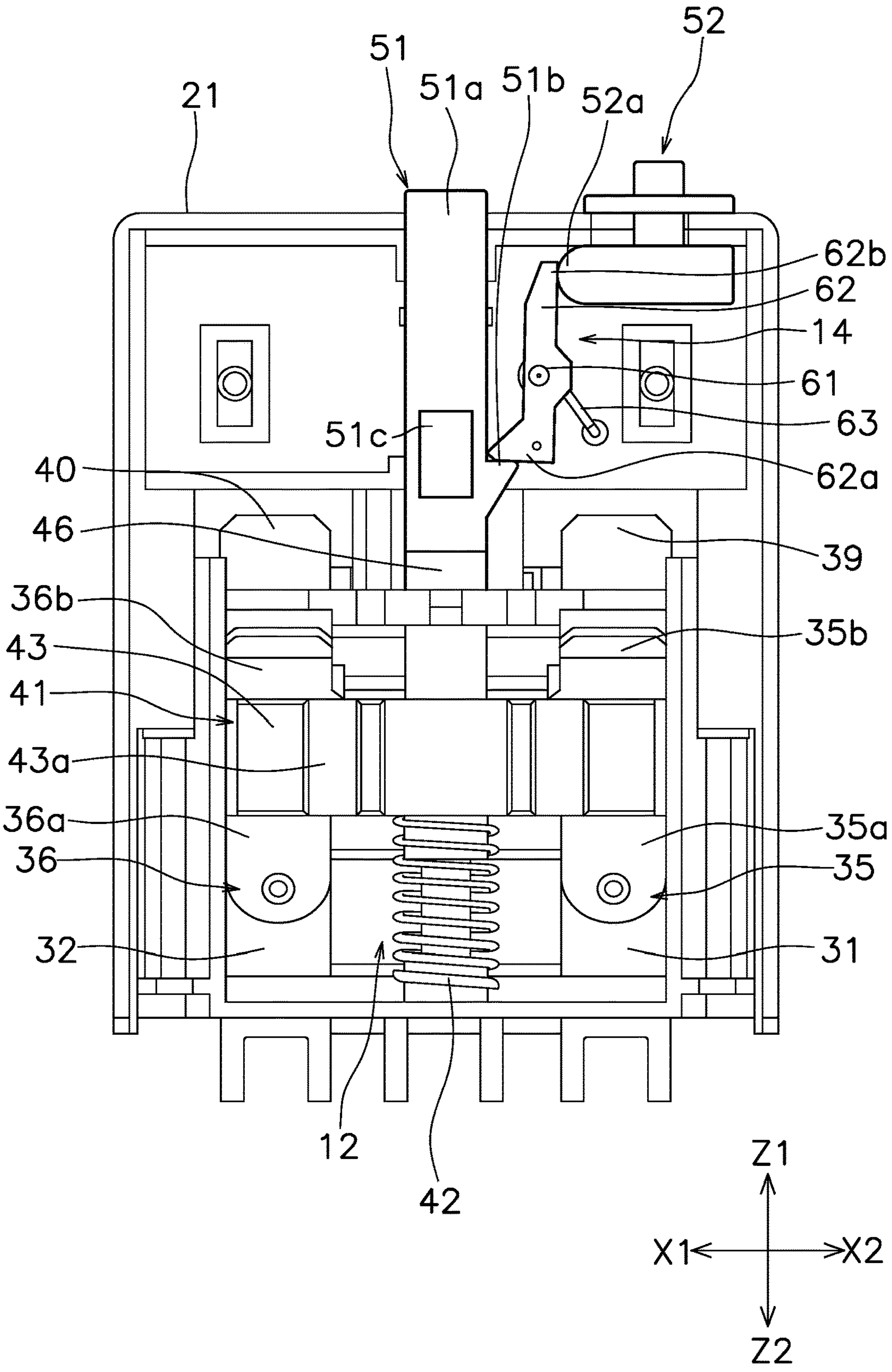
FIG. 4 is a diagram of the inside of a case from the rear.
Figure 9:
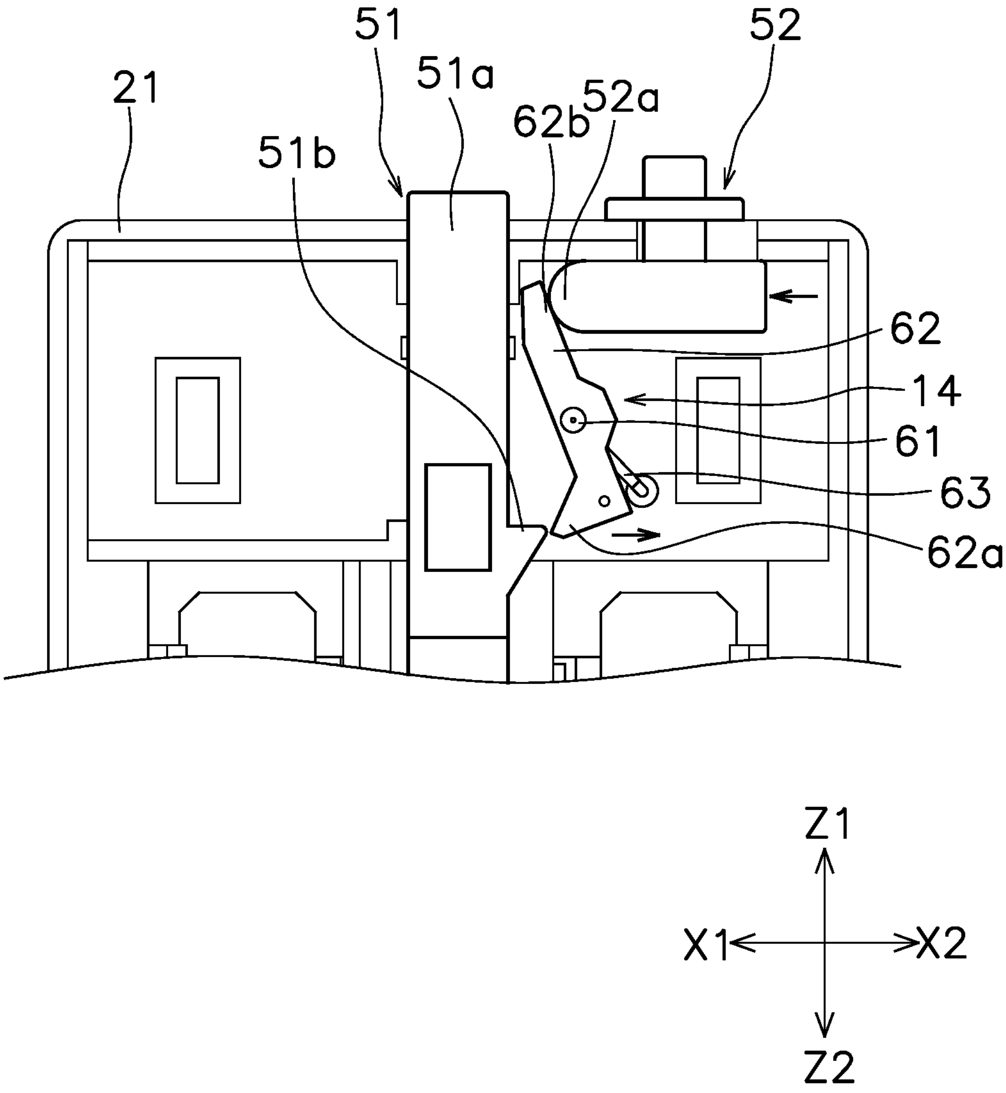
FIG. 9 is a diagram of the inside of a case from the rear.

The second operation section 52 is a sliding operation button, and is movable in the left-right direction between a third position shown in FIGS. 3 and 4 and a fourth position shown in FIG. 9. The second operation section 52 is connected to the holding mechanism 14. The second operation section 52 is urged toward the third position by the holding mechanism 14. The second operation section 52 includes a pressing portion 52*a*. The pressing portion 52*a* is arranged inside the case 10. The pressing portion 52*a* has an arcuate tip end.

The holding mechanism 14 is configured to hold the movable member 41 at the closed position and to release the holding state in which the movable member 41 is held at the closed position in response to operation of the operation member 13. In the present embodiment, the holding mechanism 14 is configured to hold the movable member 41 at the closed position or to release the holding state in which the movable member 41 is held at the closed position via the first operation section 51 in response to operation of the operation member 13. The holding mechanism 14 allows movement of the first operation section 51 from the first position to the second position and restricts movement of the first operation section 51 from the second position to the first position. The holding mechanism 14 in the present embodiment has a function as a so-called ratchet mechanism.

The holding mechanism 14 includes a support shaft 61, a ratchet member 62, and a biasing member 63. The support shaft 61 is fixed to the case 10. The support shaft 61 extends in the front-rear direction.

The ratchet member 62 is supported by the support shaft 61. The ratchet member 62 rotates about the support shaft 61 as a rotation center. For example, in FIG. 3, the ratchet member 62 rotates clockwise or counterclockwise about the support shaft 61 as a rotation center. The ratchet member 62 is rotatable between a holding posture shown in FIGS. 3 and 4 and a releasing posture shown in FIG. 9. In the holding posture, the ratchet member 62 is able to hold the first operation section 51 at the second position. In the releasing posture, the ratchet member 62 does not hold the first operation section 51 at the second position.

The ratchet member 62 includes a locking pawl 62*a* and an abutment portion 62*b*. The locking pawl 62*a* is positioned at the lower end of the ratchet member 62. The locking pawl 62*a* has a lower flat surface perpendicular to the up-down direction. When the first operation section 51 moves from the first position to the second position, the locking pawl 62*a* is pressed by the locking protrusion 51*b* of the first operation section 51 and moves in a direction away from the locking protrusion 51*b*. This movement allows the first operation section 51 to move from the first position to the second position. As the first operation section 51 moves to the second position, the locking pawl 62*a* moves to above the locking protrusion 51*b*, so that the lower surface of the locking pawl 62*a* and the upper surface of the locking protrusion 51*b* come into contact with each other. As a result, the locking protrusion 51*b* is locked by the locking pawl 62*a*, and thereby the first operation section 51 is held at the second position.

The abutment portion 62*b* is in contact with the pressing portion 52*a* of the second operation section 52, and is pressed by the pressing portion 52*a* as the second operation section 52 moves from the third position to the fourth position. The pressing causes the ratchet member 62 to move from the holding position to the releasing position. Note that when the operation of the second operation section 52 is stopped, the second operation section 52 is pressed by the abutment portion 62*b* and returns to the third position.

The biasing member 63 may be, for example, a torsion coil spring. The biasing member 63 urges the ratchet member 62 in the direction extending from the releasing posture to the holding posture. The biasing member 63 urges the ratchet member 62 clockwise in FIG. 3. The biasing member 63 urges the second operation section 52 toward the third position via the ratchet member 62.

Figure 10:
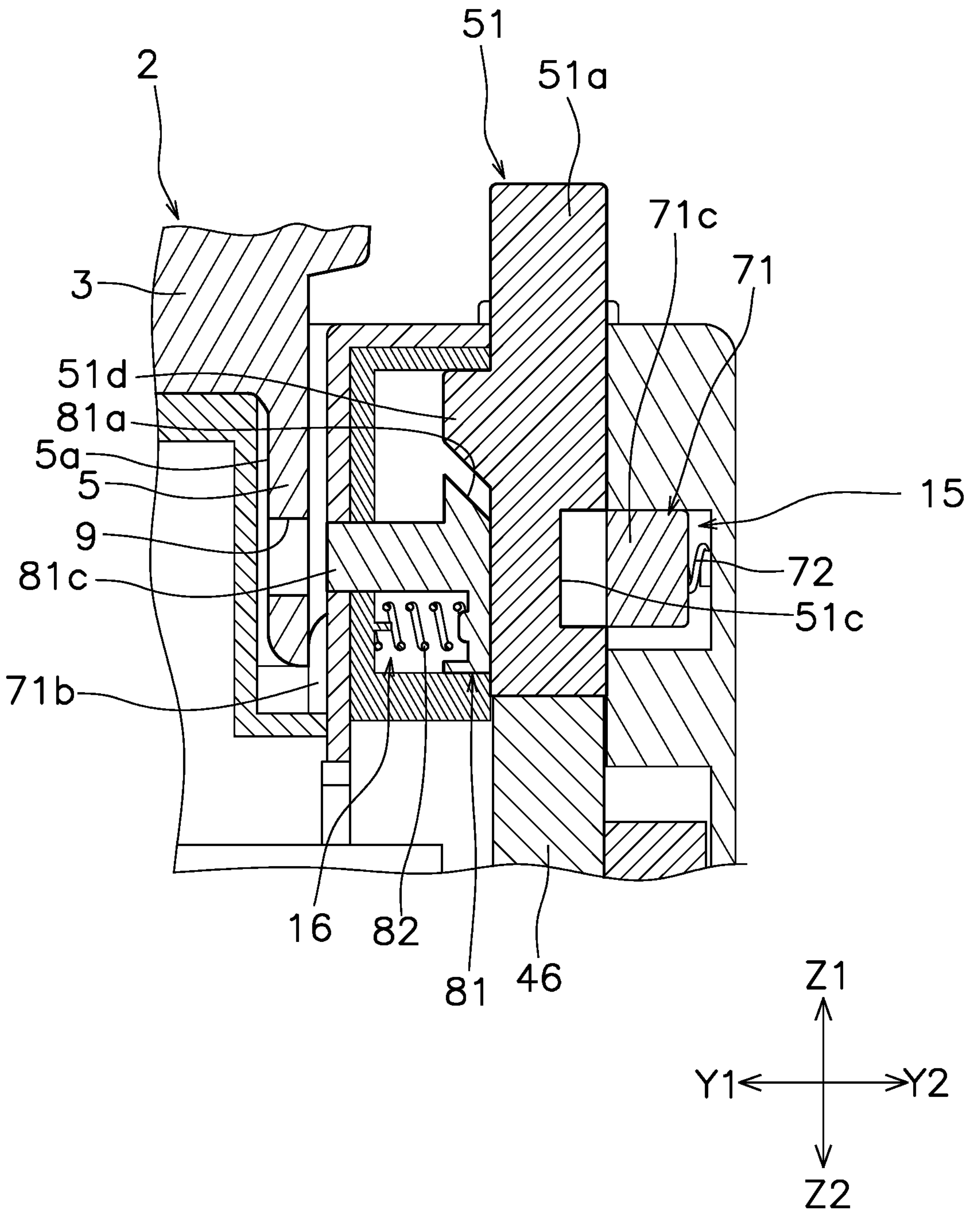
FIG. 10 is a diagram illustrating a restriction mechanism and a retaining mechanism.
Figure 11:
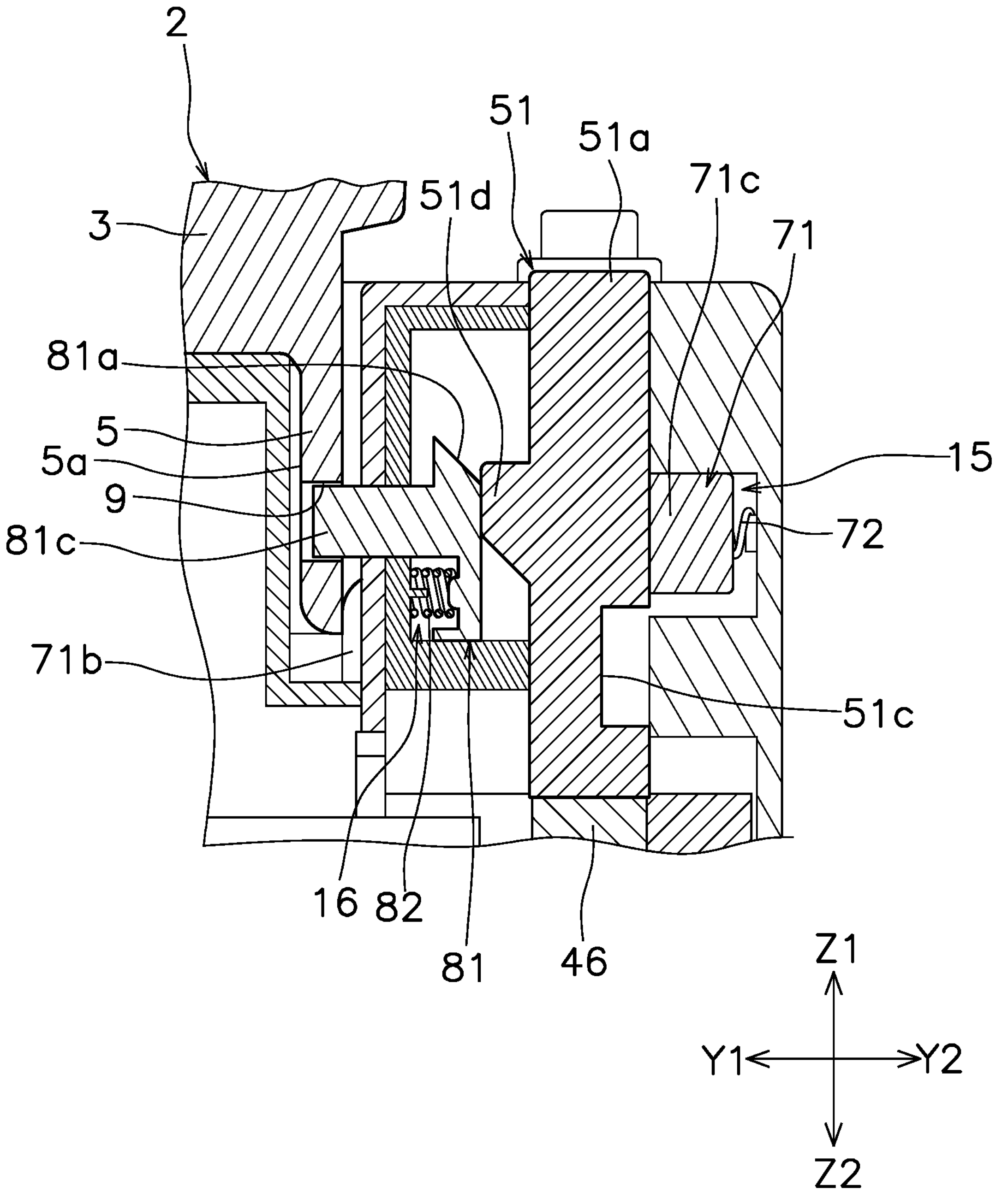
FIG. 11 is a diagram illustrating a restriction mechanism and a retaining mechanism.

As shown in FIGS. 10 and 11, the power outlet 1 includes a restriction mechanism 15 and a retaining mechanism 16.

While the electric plug 2 is not inserted in the power outlet 1, the restriction mechanism 15 is configured to restrict the first operation section 51 of the operation member 13 from moving from the first position to the second position. That is, the restriction mechanism 15 restricts the movable member 41 from moving from the open position to the closed position while the electric plug 2 is not inserted into the power outlet 1. The restriction mechanism 15 allows the first operation section 51 of the operation member 13 to move from the first position to the second position while the electric plug 2 is not inserted into the power outlet 1.

The restriction mechanism 15 includes a restriction member 71 and a biasing member 72. The restriction member 71 is supported so as to be movable only in the front-back direction with respect to the case 10. The restriction member 71 has a U-shape when viewed in the up-down direction. The restriction member 71 is movable in the front-rear direction between an advanced position shown in FIG. 2 and a retracted position shown in FIG. 10. Note that the restriction member 71 is omitted in FIGS. 3 and 4.

The restriction member 71 includes a central portion 71*a*, a pair of extension portions 71*b*, and a locking protrusion 71*c*. The central portion 71*a* extends in the left-right direction. The central portion 71*a* is disposed behind the first operation section 51. The pair of extension portions 71*b* extend forward from both ends of the central portion 71*a* in the left-right direction toward the recess 23 of the case 10. The ends of the pair of extension portions 71*b* are disposed within the recess 23 of the case 10, and have an arcuate upper surface. The locking protrusion 71*c* protrudes forward from the central portion 71*a*. The locking protrusion 71*c* is engageable with the recess 51*c* of the first operation section 51. The biasing member 72 urges the restriction member 71 toward the advanced position. In the present embodiment, the biasing member 72 is configured by a pair of coil springs.

While the electric plug 2 is not inserted in the power outlet 1, the restriction member 71 is in the advanced position, and the locking protrusion 71*c* is engaged with the recess 51*c* of the first operation section 51. This configuration restricts movement of the first operation section 51 from the first position to the second position. When electric plug 2 is inserted into power outlet 1, the ends of the pair of extension portions 71*b* of restriction member 71 are pressed by the insertion part 5 of the electric plug 2 and move backward, which causes the restriction member 71 to move to the retracted position. As a result, the locking protrusion 71*c* is disengaged from the recess 51*c* of the first operation section 51, allowing the first operation section 51 to move from the first position to the second position. When the electric plug 2 is pulled out from the power outlet 1, the restriction member 71 moves forward due to the urging force of the biasing member 82, and the restriction member 71 returns to the advanced position.

The retaining mechanism 16 prevents the electric plug 2 and the power outlet 1 from being separated while in the energized state. The retaining mechanism 16 retains the electric plug 2 at the power outlet 1 while the first operation section 51 is in the second position. That is, the retaining mechanism 16 prevents the electric plug 2 from being withdrawn from the power outlet 1 while the movable member 41 is in the closed position.

The retaining mechanism 16 includes a retaining member 81 and a biasing member 82. The retaining member 81 is supported so as to be movable only in the front-rear direction with respect to the case 10. The retaining member 81 is movable toward and backward from the engagement hole 9 of the electric plug 2. The retaining member 81 includes an inclined portion 81*a* and a locking protrusion 81*c*. The inclined portion 81*a* is pressed by the pressing protrusion 51*d* of the first operation section 51 as the first operation section 51 moves from the first position to the second position. As a result, the retaining member 81 moves forward and the locking protrusion 81*c* enters the recess 23 of the case 10. The locking protrusion 72*c* in the recess 23 engages with the engagement hole 9 of the electric plug 2. This configuration restricts the upward movement of electric plug 2 and prevents the electric plug 2 from being withdrawn from the power outlet 1. The biasing member 82 urges the retaining member 81 toward the first operation section 51.

Next, a connection operation and a disconnection operation will be described that occur when the first operation section 51 and second operation section 52 of the operation member 13 of the power outlet 1 are operated while the electric plug 2 is inserted into the power outlet 1.

When the first operation section 51 is in the first position, the movable member 41 is in the open position. In this state, the pusher 44 presses the base portion 35*b* of the movable piece 35, the pusher 45 presses the base portion 36*b* of the movable piece 36, and the movable contacts 37, 38 are separated from the fixed contacts 33, 34.

When the first operation section 51 is pressed and moved from the first position to the second position against the urging force of the return spring 42, the movable member 41 is pressed by the first operation section 51 and moves from the open position to the closed position. In this state, the pusher 44 presses the contact support portion 35*a* of the movable piece 35, the pusher 45 presses the contact support portion 36*a* of the movable piece 36, and the movable contacts 37, 38 are brought in contact with the fixed contacts 33, 34. When the pressing operation of the first operation section 51 is stopped, the first operation section 51 is held at the second position by the holding mechanism 14. Specifically, as shown in FIG. 4, the locking protrusion 51*b* of the first operation section 51 is engaged with the locking pawl 62*a* of the ratchet member 62, and thereby the first operation section 51 is held at the second position. As a result, the movable member 41 is held at the closed position via the first operation section 51, so that the movable contacts 37, 38 are held in contact with the fixed contacts 33, 34.

As shown in FIG. 9, when the second operation section 52 is slid from the third position to the fourth position while the first operation section 51 is held at the second position, the ratchet member 62 is pressed by the pressing portion 52*a* of the second operation section 52 and is moved from the holding position to the releasing position. Accordingly, the locking protrusion 51*b* of the first operation section 51 and the locking pawl 62*a* of the ratchet member 62 are disengaged, the movable member 41 is moved to the open position by the urging force of the return spring 42, and the first operation section 51 is moved to the open position. As a result, the movable contacts 37, 38 are separated from the fixed contacts 33, 34.

In the power outlet 1 of the above configuration, when the state in which movable member 41 is held at the closed position is released in response to operation of the operation member 13, the movable member 41 is moved from the closed position to the open position due to the urging force of the return spring 42. For this reason, compared to the case where the separation speed at which the movable contacts 37, 38 separate from the fixed contacts 33, 34 depends only on the restoring force of a leaf spring, the movable contacts 37, 38 are able to be quickly separated from the fixed contacts 33, 34. That is, the urging force of the return spring 42 enables the movable member 41 to be quickly moved from the closed position to the open position. Therefore, it is possible to quickly interrupt an arc that occurs between the fixed contacts 33, 34 and the movable contacts 37, 38.

One embodiment of the claimed invention has been described above. The claimed invention is not limited to the above embodiment, and various changes can be made without departing from the gist of the invention.

In the above embodiment, the operation member 13 includes the first operation section 51 and the second operation section 52. However, the operation member 13 may be configured with a single operation section. The operation member 13 may be configured with a rotary ratchet mechanism that is employed in, for example, a knock-type ballpoint pen. Alternatively, the operation member 13 may be a lever switch or a rocker switch.

In the above embodiment, the first operation section 51 is a separate member from the movable member 41. However, the first operation section 51 may be integral with the movable member 41.

REFERENCE NUMERALS

1 Power outlet
10 Case
11 Contact device
31, 32 Fixed terminal
33, 34 Fixed contact
35, 36 Movable piece
13 Operation member
14 Holding mechanism
15 Restriction mechanism
16 Retaining mechanism
42 Return spring
51 First operation section
52 Second operation section
62 Ratchet member
62*a* Locking pawl
63 Biasing member (Example of first biasing member)

The invention claimed is:

1. A power outlet, comprising:

a case;

a contact device including a fixed contact, a movable contact facing the fixed contact, and a movable piece to be connected to the movable contact;

an operation member movable relative to the case;

a moving mechanism including a movable member and a return spring, the moving mechanism being configured to move the movable piece in response to operation of the operation member, wherein the movable member is movable between a closed position at which the movable contact is in contact with the fixed contact and an open position at which the movable contact is separated from the fixed contact, and wherein the return spring is a separate member from the movable piece and urges the movable member toward the open position; and a holding mechanism configured to hold the movable member at the closed position, the holding mechanism releasing a holding state in which the movable member is held at the closed position in response to operation of the operation member, wherein the movable member, when released from the holding state, moves from the closed position to the open position by urging force of the return spring, the holding mechanism includes a locking pawl configured to lock the movable member at the closed position, and the operation member includes a first operation section configured to move the movable member from the open position to the closed position and a second operation section configured to release the locked state in which the movable member is locked by the locking pawl at the closed position.

2. The power outlet according to claim 1, wherein the return spring is a coil spring.

3. The power outlet according to claim 1, wherein the holding mechanism includes:

a ratchet member including the locking pawl, the ratchet member being configured to be rotatable between a holding posture to hold the movable member at the closed position and a releasing posture to release the holding state of the movable member; and a first biasing member configured to urge the ratchet member in a direction extending from the releasing posture to the holding posture.

4. The power outlet according to claim 1, wherein, the first operation section includes a locking protrusion configured to be engaged with the locking pawl when the movable member is moved to the closed position, wherein the first operation section is urged by the return spring in a direction extending from the closed position to the open position via the movable member.

5. The power outlet according to claim 1, wherein the locking pawl has a flat surface orthogonal to the direction extending from the closed position to the open position.

6. The power outlet according to claim 1, wherein the first operation section is configured to move the movable member from the open position to the closed position when the first operation section is pressed in a direction extending from the open position to the closed position.

7. The power outlet according to claim 1, wherein the movable piece includes a contact support portion configured to support the movable contact, a base portion, and a first fulcrum disposed between the contact support portion and the base portion, and the movable piece is pivotable around the first fulcrum, and the movable member is configured to move the movable contact away from the fixed contact by pressing the base portion and to move the movable contact toward the fixed contact by pressing the contact support portion.

8. The power outlet according to claim 1, further comprising:

a restriction mechanism, wherein the case has a recess into which an electric plug is inserted, the restriction mechanism is configured to, while the electric plug is not inserted into the recess, restrict movement of the movable member from the open position to the closed position, the movement being caused by operation of the operation member.

9. The power outlet according to claim 1, further comprising:

a retaining mechanism configured to prevent an electric plug from coming out of the case when the movable member is in the closed position, wherein the retaining mechanism includes a retaining member movable toward and away from an engagement hole that is positioned in the electric plug and a second biasing member configured to urge the retaining member toward the operation member, and the retaining member includes an inclined portion configured to be pressed against the operation member in response to movement of the operation member.

* * * * *